(12) United States Patent
Nii

(10) Patent No.: US 11,684,017 B2
(45) Date of Patent: Jun. 27, 2023

(54) ELECTRIC-POWERED CUTTING DEVICE FOR PRUNING

(71) Applicant: ARS CORPORATION, Sakai (JP)

(72) Inventor: Hidetatsu Nii, Sakai (JP)

(73) Assignee: ARS CORPORATION, Sakai (JP)

( * ) Notice: Subject to any disclaimer, the term of this patent is extended or adjusted under 35 U.S.C. 154(b) by 0 days.

(21) Appl. No.: 17/641,762

(22) PCT Filed: Sep. 11, 2020

(86) PCT No.: PCT/JP2020/034569
§ 371 (c)(1),
(2) Date: Mar. 9, 2022

(87) PCT Pub. No.: WO2021/049641
PCT Pub. Date: Mar. 18, 2021

(65) Prior Publication Data
US 2022/0312680 A1 Oct. 6, 2022

(30) Foreign Application Priority Data
Sep. 13, 2019 (JP) ................................ 2019-167555

(51) Int. Cl.
*A01G 3/037* (2006.01)
*B26B 15/00* (2006.01)
*A01G 3/02* (2006.01)

(52) U.S. Cl.
CPC ............. *A01G 3/037* (2013.01); *A01G 3/02* (2013.01); *B26B 15/00* (2013.01)

(58) Field of Classification Search
CPC ......... A01G 3/037; A01G 3/033; B26B 15/00
(Continued)

(56) References Cited

U.S. PATENT DOCUMENTS 3,178,816 A * 4/1965 Schmid .................. B26B 15/00
30/247
5,867,909 A * 2/1999 Jeltsch .................. A01G 3/037
30/216
(Continued)

FOREIGN PATENT DOCUMENTS

EP 3103598 A 12/2016
EP 3141356 A 3/2017
(Continued)

OTHER PUBLICATIONS

International Search Report and Written Opinion; International Patent Application No. PCT/JP2020/034569, dated Oct. 6, 2020, with English translation of Search Report (9 pages).

*Primary Examiner* — Phong H Nguyen
(74) *Attorney, Agent, or Firm* — Hamre, Schumann, Mueller & Larson, P.C.

(57) ABSTRACT

There is provided electric pruning shears capable of arbitrarily adjusting an opening/closing width of a blade so as to improve user's satisfaction. Electric pruning shears 1 that cut an object sandwiched between a movable blade 4 and a fixed blade 5 is provided with a control board 109 that executes: a setting changing operation of operating, when a maximum open position adjusting portion 80 receives a change input, a motor 6 to move the movable blade 4 at the maximum opening angle with an opening/closing width before change to the maximum opening angle with an opening/closing width after change; and a movable blade opening/closing operation of operating, when an operation portion 60 is operated, the motor 6 to open/close the movable blade 4 between the maximum opening angle and the maximum closing angle with the opening/closing width after change.

5 Claims, 7 Drawing Sheets

(58) Field of Classification Search
USPC .......... 30/228, 244, 245, 247, 249, 251, 254
See application file for complete search history.

(56) References Cited

U.S. PATENT DOCUMENTS

| | | | |
|---|---|---|---|
| 6,044,564 A * | 4/2000 | Jeltsch | .................... A01G 3/037 |
| | | | 30/247 |
| 2013/0055575 A1 | 3/2013 | Delmas | |
| 2015/0113810 A1 * | 4/2015 | Zurcher | .............. F16C 11/0604 |
| | | | 74/89.36 |
| 2015/0121706 A1 * | 5/2015 | Zurcher | ................. B23D 29/02 |
| | | | 74/89.36 |

FOREIGN PATENT DOCUMENTS

| | | |
|---|---|---|
| JP | H2-238819 A | 9/1990 |
| JP | 2017-322 A | 1/2017 |
| JP | 2017-55853 A | 3/2017 |
| KR | 10-2015-0035840 A | 4/2015 |

* cited by examiner

ELECTRIC-POWERED CUTTING DEVICE FOR PRUNING

TECHNICAL FIELD

The present invention relates to an electric cutting device for pruning used to prune plants, for example.

BACKGROUND ART

Conventionally, various pruning shears have been used for pruning plants. In recent years, pruning shears that electrically operate blades have also been proposed.

For example, pruning shears that perform pruning by operating the blades by driving a motor have been proposed (see Patent Literature 1). In such pruning shears, when a trigger 29 is pulled and tilted, a switch lever 31 turns on a switch 28, whereby the motor is activated to close a movable blade 18 with respect to a fixed blade 10.

However, since the pruning shears close the movable blade 18 by performing an ON operation and return the movable blade 18 by performing an OFF operation, the pruning shears can only be moved from the same maximum opened state to the same closed state at the time of pruning. For this reason, for example, in a case where the blades are passed through a gap between branches to cut one branch therebetween, the blades cannot be fixed at an arbitrary position desired by the user to pass through the gap between the branches.

CITATION LIST

Patent Literature

Patent Literature 1: JP H2-238819

SUMMARY OF THE INVENTION

Technical Problems

In view of the above problems, an object of the present invention is to provide an electric cutting device for pruning capable of arbitrarily adjusting an opening/closing width of the blades, so as to improve the user's satisfaction.

Solution to Problems

The present invention provides an electric cutting device for pruning and a method of operating the electric cutting device for pruning, the electric cutting device including: a cutting portion that performs cutting by sandwiching an object between two blades including at least one movable blade; a cutting operation portion that receives a cutting input for causing the cutting portion to perform a cutting operation; an operation mechanism that operates the movable blade in an opening direction and a closing direction; a power supply unit that supplies power to the operation mechanism; a control unit that operates with power of the power supply unit, receives the cutting input by the cutting operation portion, causes the operation mechanism to operate, and controls the cutting operation by the cutting portion; and an opening/closing width operation portion that receives a change input of an opening/closing width of the movable blade, wherein the control unit is configured to perform: a setting changing operation of operating, when the opening/closing width operation portion receives the change input, the operation mechanism to move the movable blade at a maximum opening angle with an opening/closing width before change to a maximum opening angle with an opening/closing width after change; and a movable blade opening/closing operation of operating, when the cutting operation portion is operated, the operation mechanism to open/close the movable blade between the maximum opening angle and a maximum closing angle with the opening/closing width after change.

Advantageous Effects of the Invention

According to the present invention, it is possible to provide an electric cutting device for pruning capable of arbitrarily adjusting the maximum opening position of the blades, so as to improve the user's satisfaction.

DESCRIPTION OF EMBODIMENTS

Figure 1:
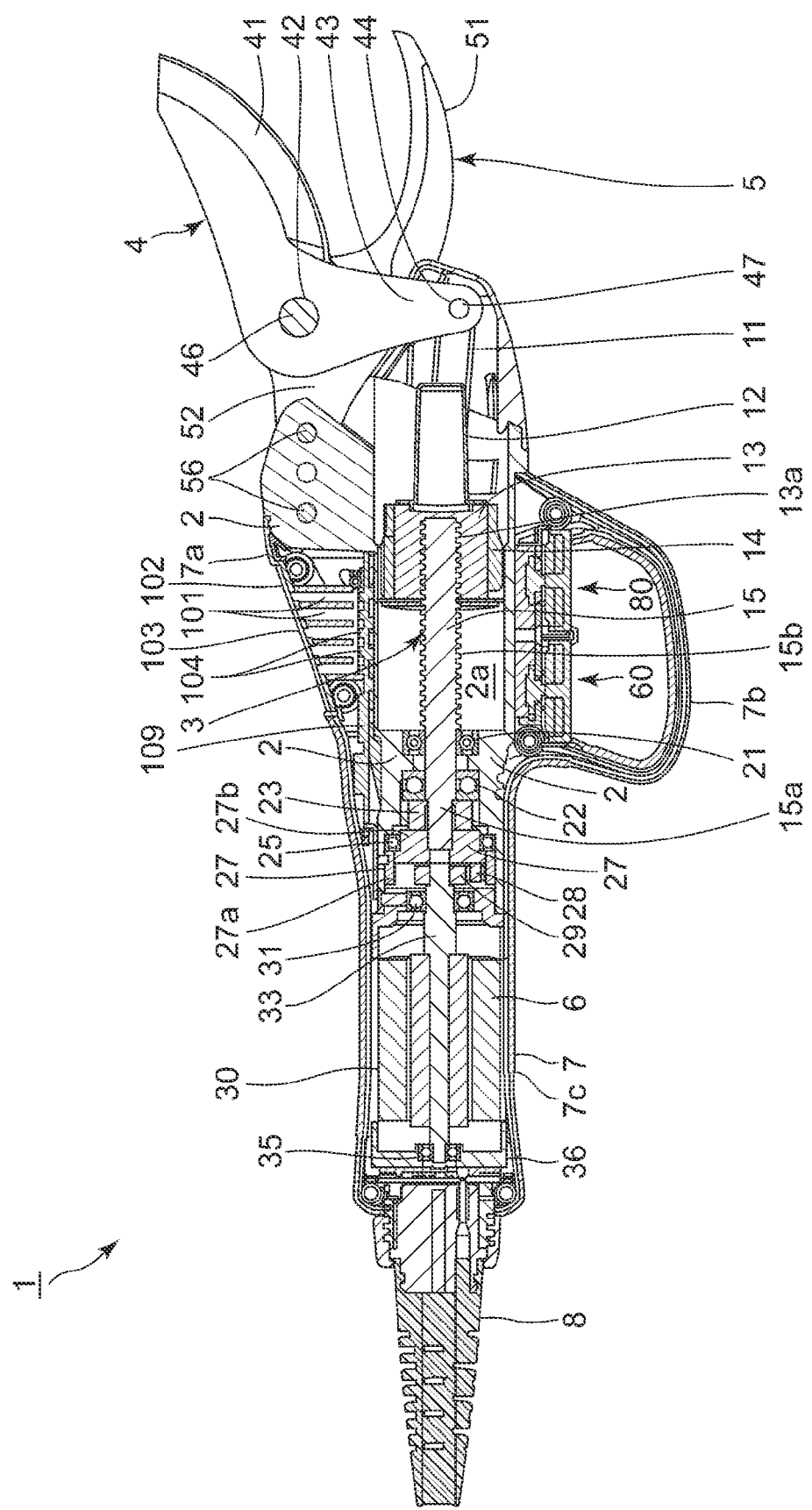
FIG. 1 is a longitudinal sectional right side view of electric pruning shears in a state where a movable blade is opened.
Figure 2:
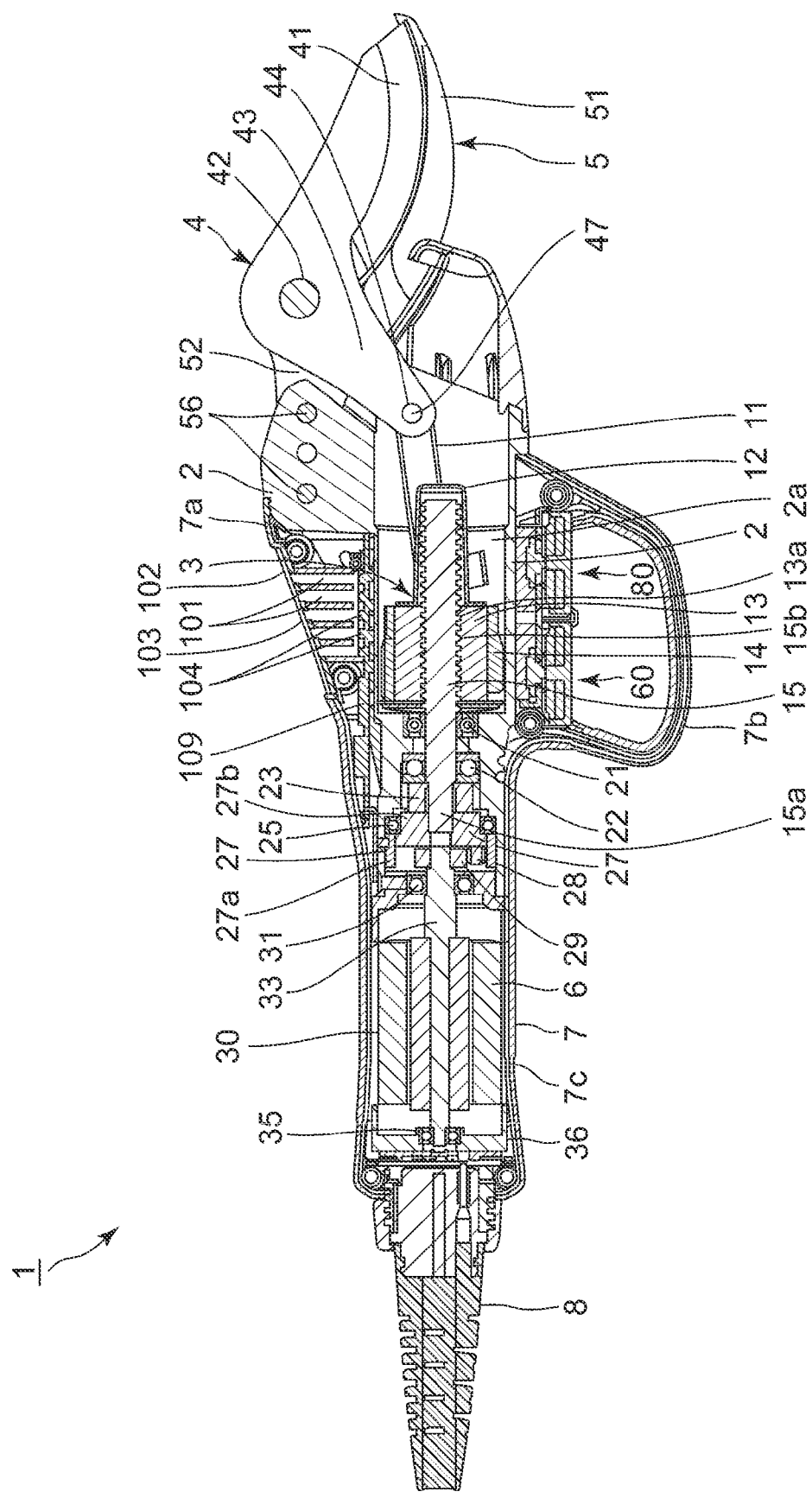
FIG. 2 is a longitudinal sectional right side view of the electric pruning shears in a state where the movable blade is closed.
Figure 3:
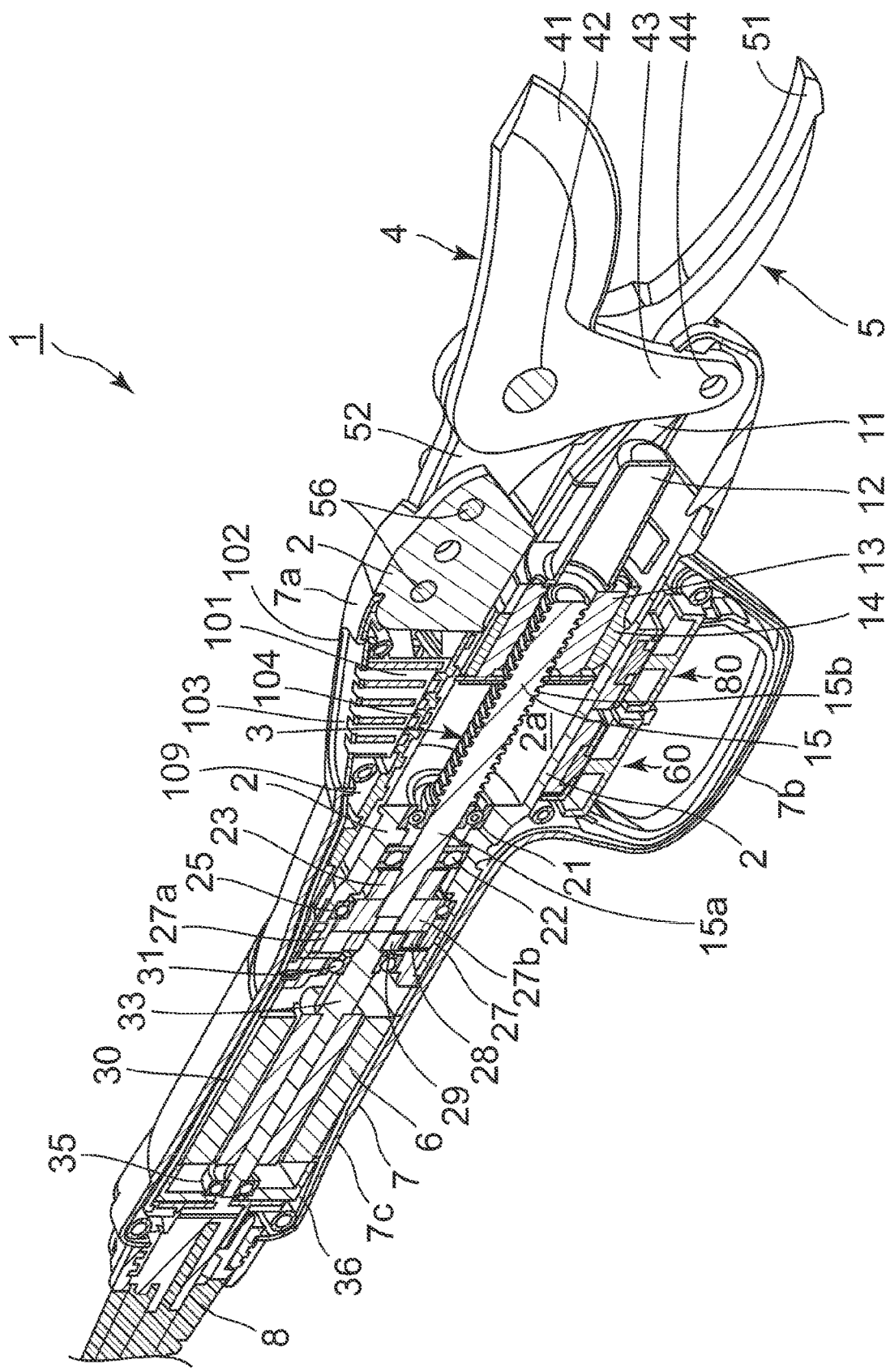
FIG. 3 is a longitudinal sectional perspective view of the electric pruning shears.
Figure 4:
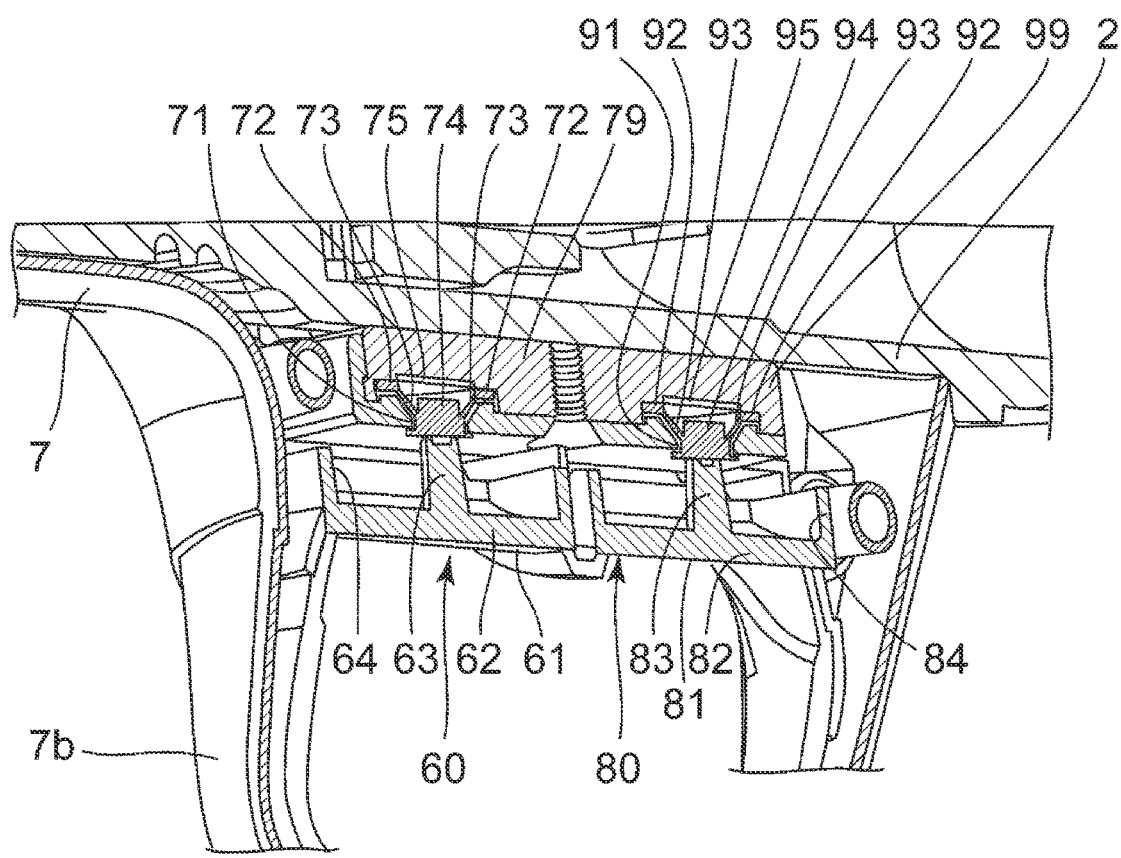
FIG. 4 is an enlarged longitudinal sectional perspective view around a trigger button and an opening/closing width operation button.

FIG. 1 is a longitudinal sectional right side view of electric pruning shears 1 (an electric cutting device for pruning) according to a first embodiment of the present invention when a movable blade 4 is opened, FIG. 2 is a longitudinal sectional right side view of the electric pruning shears 1 when the movable blade 4 is closed, FIG. 3 is a longitudinal sectional perspective view of the electric pruning shears 1, and FIG. 4 is an enlarged longitudinal sectional perspective view around a trigger button 61 and an opening/closing width operation button 81 of the electric pruning shears 1.

As shown in FIG. 1, the electric pruning shears 1 include a housing 2 that has a longitudinal shape in lying state, a motor unit 30 connected to one end of the housing 2 in the longitudinal direction, a cover 7 that covers the outer peripheries of the housing 2 and the motor unit 30, a fixed blade 5 that is fixed to the other end of the housing 2 in the longitudinal direction, the movable blade 4 that opens/closes while facing the fixed blade 5, and a power cable 8 having one end connected to the other end of the motor unit 30 different from the housing 2. The fixed blade 5 and the movable blade 4 function as a cutting portion for cutting an object.

An operation portion 60 that operates the movable blade 4 and a maximum open position adjusting portion 80 that adjusts the maximum opening position of the movable blade 4 are arranged side by side in the longitudinal direction on one part of a lower surface portion of the outer periphery of housing 2, and a display 103 is arranged on an upper surface portion, which is the other part than the one part.

A control device (not shown) is connected to the other end of the power cable 8. The control device performs various controls of the electric pruning shears 1, and also functions as a battery (power supply unit) that supplies electric power necessary for the operation of the electric pruning shears 1.

The motor unit 30 includes a motor housing 36 formed in a cylindrical shape, and a motor 6 fixed inside the motor housing 36. The motor 6 is provided with a motor shaft 33 passing through the center in parallel with the longitudinal direction of the housing.

The motor shaft 33 is rotatably supported by a motor shaft bearing 31 on the housing 2 side and a motor shaft bearing 35 on the power cable 8 side. A disk-shaped sun gear 29 having teeth aligned on the outer periphery thereof is fixed to an end portion of the motor shaft 33 on the housing 2 side.

The housing 2 is formed in a substantially cylindrical shape, and has a hollow inside. The housing 2 is provided, on a part of the outer periphery on the side opposite to the motor unit 30 (i.e., a part of the upper surface side), with a protruding fixing portion 56, and a fixed blade body portion 52 of the fixed blade 5 is fixed to the fixing portion 56.

An inclined portion 102 whose protruding amount gradually decreases toward the motor unit 30 is provided on the motor unit 30 side of the fixing portion 56, and the display 103 is provided on the inclined portion 102.

The display 103 includes a plurality of LEDs 104 arranged on a control board 109 provided inside the housing 2, and a plurality of light guide bodies 101 linearly arranged from a surface of the LEDs 104 to a surface of the inclined portion 102.

The plurality of (five in the present embodiment) LEDs 104 are arranged at equal intervals in the longitudinal direction of the housing 2, and the same number of LEDs 104 are arranged in parallel to each other at intervals. The control board 109 has a substantially rectangular shape, and is arranged at a position close to a columnar space of the housing 2 in which a ball screw unit 3 is housed, such that the control board 109 is parallel to the longitudinal direction of the housing 2 (the longitudinal direction of the screw shaft 15) and the radial direction of the screw shaft 15 becomes the thickness direction of the control board 109.

Thus, the display 103 can function as, for example, a remaining power display. In such a case, the control board 109 receives an output corresponding to the remaining power of the battery (not shown), and can emit light so as to be visually recognizable by the user in such a manner: turning on all the LEDs 104 when the remaining power is the maximum, turning on about half of the LEDs 104 from one end of the plurality of LEDs when the remaining power is half, turning on only one of the LEDs 104 at the one end when the remaining power is small, and turning off all the LEDs 104 when the power is almost exhausted.

In the present embodiment, the light emission of the LEDs 104 at the five locations corresponds to the remaining power of the battery, and the user can know the remaining power of the battery, i.e., the rough remaining operating time of the electric pruning shears 1, based on the number of the light emission.

In the housing 2, a speed reducer 27 connected to the motor shaft 33, and the ball screw unit 3 connected to the speed reducer 27 are arranged in this order from the motor unit 30 side in the longitudinal direction.

The speed reducer 27 includes an output rotor 27b having a substantially disk shape with the axial direction of the screw shaft 15 as the central axis, and a ring-shaped portion 27a arranged on the motor 6 side of the output rotor 27b. The ring-shaped portion 27a is arranged such that the axis of the circle center is positioned on the extension line of the motor shaft 33; the outer periphery of the ring-shaped portion 27a is fixed to the housing 2, and a gear surface is provided on the inner surface of the ring-shaped portion 27a.

The output rotor 27b is fixed to the inside of a bearing 25 whose outer periphery is fixed to the housing 2 so that the output rotor 27b can rotate around a rotating shaft on an extension line of the rotating shaft of the motor shaft 33. In the output rotor 27b, three shafts (not shown) protruding toward the ring-shaped portion 27a side are provided at equal intervals in parallel with the rotating shaft, and a planetary gear 28 is rotatably supported by each shaft.

The outer periphery of the output rotor 27b is fixed to the inside of the bearing 25. The outer periphery of the bearing 25 is fixed to the housing 2. The bearing 25 rotatably supports the output rotor 27b so that the output rotor 27b can rotate around the rotating shaft on the extension line of the rotating shaft of the motor shaft 33. The planetary gear 28 engages with the teeth on the outer periphery of the sun gear 29 and the teeth of the gear on the inner surface of the ring-shaped portion 27a, obtains the rotational force of the sun gear 29, and rolls along the teeth on the inner surface of the ring-shaped portion 27a. Since the shaft of the output rotor 27b also moves by this rolling, the output rotor 27b rotates slower than the rotation speed of the sun gear 29.

The ball screw unit 3 includes a screw shaft 15 and a nut 13. A nut holder 14 arranged on the outer periphery of the nut 13, a ball screw cover 12 provided on the fixed blade 5 side, and one end of a link rod 11 (a connecting portion) arranged on the fixed blade 5 side are fixed to the nut 13. The motor 6, the screw shaft 15, the nut 13, and the link rod 11 function as an operation mechanism for opening/closing the movable blade 4 in response to the pressing of the trigger button 61.

The screw shaft 15 has a rod shape elongated in the longitudinal direction. The screw shaft 15 is provided with a screw portion 15b on the outer periphery thereof, and is arranged at the center in the longitudinal direction of the housing 2. A base portion 15a having no screw portion 15b is provided at one end of the screw shaft 15 on the motor unit 30 side, and an end portion of the base portion 15a is fixed to the center of the output rotor 27b of the speed reducer 27. Thus, the screw shaft 15 rotates in conjunction with the output rotor 27b of the speed reducer 27.

The base portion 15a of the screw shaft 15 is rotatably supported by ball screw bearings 21 and 22 arranged apart from each other in the axial direction so that the base portion 15a can rotate around the rotating shaft on the extension line of the rotating shaft of the motor shaft 33. The outer peripheries of the ball screw bearings 21 and 22 are fixed to the housing 2.

A base nut 23 is provided between the ball screw bearing 22 and the output rotor 27b, and the base nut 23 is positioned so that the distance between the ball screw bearing 22 and the output rotor 27b does not change. The screw shaft 15 has, in a range from the middle thereof to a distal end thereof on the movable blade 4 side, the screw portion 15b to be screwed with the nut 13.

Since the screw shaft 15 is supported by the output rotor 27b and the ball screw bearings 21 and 22 at three positions in the axial direction, the screw shaft 15 is less shaken, so that stability is improved.

The nut 13 is formed in a cylindrical shape having a hollow inside, and has a screw portion 13a formed on an inner surface thereof. The screw portion 13a of the nut 13 is screwed with the screw portion 15b of the screw shaft 15.

The nut holder 14 has a cylindrical shape, and is fixed to the nut 13 so as to cover the outer periphery of the nut 13. The outer periphery of the nut holder 14 is formed in a cylindrical shape, in which the size of the cylindrical shape is set so that the outer periphery of the nut holder 14 can be slid along a cylindrical slide inner surface 2a of the housing 2 and a gap between the outer periphery of the nut holder 14 and the slide inner surface 2a is minimized.

One of the outer periphery of the nut holder 14 and the slide inner surface 2a of the housing 2 is provided with a slide groove in a longitudinal direction parallel to the screw shaft 15, and the other is provided with a rail protrusion. Since the rail protrusion and the slide groove engage with each other, the nut holder 14 is housed in the housing 2 in a manner in which the nut holder 14 does not rotate in the circumferential direction with respect to the housing 2 but can be slid in the longitudinal direction. With this configuration and the screwing of the screw portion 13a of the nut 13 and the screw portion 15b of the screw shaft 15, when the screw shaft 15 rotates forward and backward, the nut 13 moves back and forth in the longitudinal direction (axial direction) of the screw shaft 15. Alternatively, the nut 13 may also be configured to move back and forth in the axial direction of the screw shaft 15 by the rotation of the screw shaft 15 without providing the slide groove and the rail protrusion.

The ball screw cover 12 has a cylindrical shape with a size capable of accommodating the screw shaft 15 inside, and has a hollow inside. The ball screw cover 12 is fixed to the center of the distal end of the nut 13 or the nut holder 14 on the movable blade 4 side, and covers a screw hole of the nut 13.

The ball screw cover 12 protrudes toward the nut holder 14 at least longer than the movement distance of the nut 13, and protects, in the entire range in which the nut 13 moves in the longitudinal direction on the speed reducer 27 side by the rotational movement of the screw shaft 15, the screw shaft 15 protruding from the nut 13 toward the movable blade 4.

The link rod 11 has a long plate shape with one end in the longitudinal direction pivotally supported by the nut 13, the nut holder 14, or the ball screw cover 12, and the other end pivotally supported by a drive connection portion 44 of a movable blade body portion 43 of the movable blade 4 by a driving shaft 47. The one end of the link rod 11 is preferably pivotally supported by the nut 13 formed of a metal member.

With this configuration, the link rod 11 transmits the longitudinal movement of the nut 13 to the drive connection portion 44 of the movable blade 4. In such transmission, the angle of the link rod 11 with respect to the nut 13, the nut holder 14, or the ball screw cover 12, and the angle of the link rod 11 with respect to the movable blade 4 are allowed to fluctuate to some extent due to the fact that the supporting parts can independently rotate.

The fixing portion 56 of the housing 2 fixes the fixed blade body portion 52 of the fixed blade 5. It is preferable that two or more fixing portions 56 are provided in order to more firmly fix the fixed blade 5.

The cover 7 is formed in a substantially cylindrical shape elongated in the longitudinal direction, and covers the outer peripheries of the housing 2 and the motor unit 30. A rear portion (a rear portion on the side of the motor unit 30 side) of the cover 7, behind the half of the electric pruning shears 1, can be used as a grip portion 7c to be gripped by the user. The cover 7 has, on the upper side in front of the half of the electric pruning shears 1 (on the side of the fixed blade 5), an inclined portion 7a that is inclined upward so as to expand toward the distal end.

The inclined portion 7a is provided with the display 103. The cover 7 has, on the lower side (the side opposite to the display 103) in front of the half of the electric pruning shears 1 (on the side of the fixed blade 5), a curved rod-shaped operation finger protector 7b so as to surround the operation portion 60 and the maximum open position adjusting portion 80. The operation finger protector 7b has a space sufficiently to allow the user to move the finger between the operation finger protector 7b and the operation portion 60 and maximum open position adjusting portion 80.

The fixed blade 5 is made of metal and has a plate shape with a constant thickness. The fixed blade 5 has, substantially at the center thereof, a hole (not shown) through which a rotating shaft 46 (see FIG. 1) is inserted. The fixed blade body portion 52 is provided on one side (the housing 2 side) of the hole, and a fixed blade cutting portion 51 is provided on the other side (the distal end side opposite to the housing 2 side) of the hole.

The fixed blade body portion 52 is fixed to the housing 2 by the fixing portion 56 such that the thickness direction becomes a left-right direction (i.e., the depth direction in FIG. 1) and the blade of the fixed blade cutting portion 51 faces upward (i.e., faces the movable blade 4 side). The fixed blade cutting portion 51 is provided, on a side facing movable blade 4, with a curved blade having a concave center.

The movable blade 4 is a substantially L-shaped plate made of metal, and is provided with a shaft support hole 42 substantially at the center. The movable blade 4 is arranged so as to overlap with the fixed blade 5 in the thickness direction, and is pivotally supported by the rotating shaft 46 inserted into the shaft support hole 42 so as to be able to rotate with respect to the fixed blade 5.

The movable blade 4 includes the movable blade body portion 43 serving as one leg of the substantially L-shape, and a movable blade cutting portion 41 serving as the other leg. The movable blade body portion 43 has, at an end portion thereof, the drive connection portion 44 into which the driving shaft 47 connected to the link rod 11 is inserted. The movable blade cutting portion 41 is provided with a curved blade whose center is convex on a side facing fixed blade 5, and is formed to be sharp from the center portion toward the end portion. Note that the movable blade 4 and the fixed blade 5 are not limited to curved blades, but may have appropriate shapes such as straight blades or corrugated blades.

With the above configuration, the drive connection portion 44 of the movable blade body portion 43 of the movable blade 4 is rotated about the rotating shaft 46 by the link rod 11 that moves back and forth according to the movement of the nut 13 in the longitudinal direction.

At this time, the movable blade cutting portion 41 rotates together with the movable blade 4, and thus the movable blade cutting portion 41 performs opening/closing operation with respect to the fixed blade cutting portion 51. Since the movable blade cutting portion 41 is a convex surface with respect to the fixed blade 5 and the fixed blade cutting portion 51 is a concave surface with respect to the movable blade 4, and since curvatures of the convex surface and the concave surface are substantially the same, an object-to-be-cut such as a branch can be sandwiched and cut between the movable blade cutting portion 41 rotated in the closing direction and the fixed blade cutting portion 51.

The operation portion 60 is located at the lower front of the housing 2. As shown in FIG. 4, the operation portion 60 includes the trigger button 61, a pressing force reducing member 71, an ON/OFF sensor 75, and an operation base portion 79.

The trigger button 61 has a box shape with an upper surface on the pressing force reducing member 71 side opened, and has a hollow inside. The trigger button 61 includes a pressing surface portion 62 having a length of at least half of the thickness of an operation finger of a general person, a peripheral wall surface portion 64 rising from the periphery of the pressing surface portion 62 (a pushing operation surface portion) toward the ball screw unit 3, and a support strut 63 (a pressing force converging protrusion) protruding toward the ball screw unit 3 at the center of the pressing surface portion 62 and coming into contact with a deformable body 74. The support strut 63 of the trigger button 61 is made of a silicon material, and is formed so as to be able to expand and contract (deform). The support strut 63 plays a role of transmitting a pressing force applied to the pressing surface portion 62, and can be formed of an appropriate material such as a resin material, instead of being limited to the silicon material.

The pressing force reducing member 71 is formed of a silicon material that can expand and contract (deform). The pressing force reducing member 71 includes a ring-shaped base portion 72 fixed to the operation base portion 79, a bridge 73 (a bridge portion) that protrudes while reducing the diameter from the ring-shaped base portion 72 toward the support strut 63, and the deformable body 74 provided at the center of the distal end of the bridge 73.

The bridge 73 has a side circumferential shape of a truncated cone, and has a small thickness. The bridge 73 connects the deformable body 74 and the ring-shaped base portion 72. The deformable body 74 has a cylindrical shape with the longitudinal direction (pushing direction) of the support strut 63 as the axis, and is formed to be thicker in the pushing direction than the bridge 73. The bridge 73 is radially formed in a symmetrical shape with the deformable body 74 as the center. In the present embodiment, the bridge 73 has the truncated cone shape; however, the present invention also includes a configuration in which the bridge 73 has a shape that uniformly deforms at any position from the center deformable body 74 to the operation base portion 79 on the outer periphery, such as a shape in which a plurality of rod-shaped members are radially arranged.

The deformable body 74 is formed in a cylindrical shape. The deformable body 74 may be integrally formed with the bridge 73 using the same material as that of the bridge 73, or may be formed separately from the bridge 73 using a silicon material other than that of the bridge 73 and connected to the bridge 73. An end surface of the deformable body 74 on the operation base portion 79 side (on the side of the ON/OFF sensor 75) is separated from the ON/OFF sensor 75. The deformable body 74 has a cylindrical shape with the pressing direction as the axial center, and is arranged such that both end surfaces thereof are parallel to the surface of the ON/OFF sensor 75 (the pressed surface). Thus, the pressing force is transmitted straight to the ON/OFF sensor 75, and the deformable body 74 is deformed so as to expand and contract in the pressing direction on the spot without generating bending or the like.

The ON/OFF sensor 75 can be any sensor as long as it can detect ON/OFF. For example, an appropriate sensor can be used as the ON/OFF sensor 75 such as a switch sensor that switches ON/OFF with a switch, or a piezoelectric sensor capable of sensing a pressing force to turn ON if the pressing force is equal to or greater than a predetermined value and turn OFF if the pressing force is less than the predetermined value or the pressing force is released. In a case where the ON/OFF sensor 75 is a piezoelectric sensor, the piezoelectric sensor is not particularly limited as long as it can detect a pressing force caused by pressing; for example, the ON/OFF sensor 75 can be configured by a piezoelectric element of an appropriate type such as a piezoresistive type, a capacitive type, a film forming type, a resistance wire type or the like.

With such a configuration, when the user pushes the trigger button 61 using several fingers of the hand gripping the electric pruning shears 1, the bridge 73 of the pressing force reducing member 71 is deflected to bring the deformable body 74 into contact with the ON/OFF sensor 75, and when the trigger button 61 is further pushed, the ON/OFF sensor 75 is pressed down through the deformable body 74.

At this time, since the deformable body 74 expands and contracts, the load applied from the trigger button 61 is gradually adjusted and applied, so that stroke (width of the pressing force) until the ON/OFF sensor 75 detects ON can be lengthened (widened).

Further, since the deformable body 74 and the ON/OFF sensor 75 are separated from each other by a distance corresponding to the length of the bridge 73, the deformable body 74 does not come into contact with the ON/OFF sensor 75 and does not detect ON just because the finger is placed on the trigger button 61.

Thus, by providing a space (allowance) in which the deformable body 74 and the ON/OFF sensor 75 are separated from each other, it is possible to prevent the ON/OFF sensor 75 from being unintentionally turned on by an unexpected light contact with the trigger button 61, and thereby prevent the movable blade 4 from being actuated. Further, in a case where the ON/OFF sensor 75 is a piezoelectric sensor, a state in which a pressing force equal to or greater than a predetermined value is detected is turned ON, and a state in which no pressing force is detected or a pressing force less than the predetermined value is detected is turned OFF, so that it is possible to prevent the trigger button from being operated until the trigger button 61 is pressed with a pressing force of a certain level. Thus, the movable blade 4 can be closed when the user firmly presses the trigger button 61. Further, it is possible to make appropriate settings by adjusting the pressing force to be equal or greater than the predetermined value for turning ON, such as a setting in which cutting operation can be performed by closing movable blade 4 with a light force, or a setting in which movable blade 4 does not operate unless being firmly pressed.

The maximum open position adjusting portion 80 is provided adjacent to the front of the operation portion 60, at the lower front of the housing 2. The maximum open position adjusting portion 80 includes the opening/closing width operation button 81, a pressing force reducing member 91, an ON/OFF sensor 95, and a switching base portion 99.

In the present embodiment, the maximum open position adjusting portion 80 is arranged in front of the operation portion 60. However, the arrangement of the maximum open position adjusting portion 80 and the operation portion 60 may be appropriately replaced on the manufacturing side.

The opening/closing width operation button 81 has a box shape with an upper surface on the pressing force reducing member 91 side opened, and has a hollow inside. The opening/closing width operation button 81 includes a pressing surface portion 82 having a length of at least half of the thickness of an operation finger of a general person, a peripheral wall surface portion 84 rising from the periphery of the pressing surface portion 82 toward the ball screw unit 3, and a support strut 83 (a pressing force converging protrusion) protruding toward the ball screw unit 3 at the center of the pressing surface portion 82 and coming into contact with a deformable body 94. The support strut 83 of the opening/closing width operation button 81 is made of a silicon material, and is formed so as to be able to expand and contract (deform). The support strut 83 plays a role of transmitting a pressing force applied to the pressing surface portion 82, and can be formed of an appropriate material such as a resin material, instead of being limited to the silicon material.

The pressing force reducing member 91 has the same shape as the pressing force reducing member 71 described above, and includes a ring-shaped base portion 92, a bridge 93, and the deformable body 94. The ON/OFF sensor 95 and the switching base portion 99 are arranged with respect to the pressing force reducing member 91 in the same arrangement as the above-described pressing force reducing member 71, ON/OFF sensor 75, and operation base portion 79. The ON/OFF sensor 95 has the same configuration as that of the ON/OFF sensor 75 described above.

With this configuration, when the user pushes the opening/closing width operation button 81 using the index finger or the like of the hand gripping the electric pruning shears 1, the ON/OFF sensor 95 is turned on to operate, so as to be able to execute a preset mode. Mode can be appropriately set, for example, to each mode (for example, a fully open mode, a half open mode and the like) in which the maximum open position of movable blade 4 is different, and details will be described later.

Since the maximum open position adjusting portion 80 has the same configuration as that of the operation portion 60 described above, it is possible to prevent an unintended operation similarly to the operation portion 60. In other words, even if the user grips the electric pruning shears 1 and lightly touches the opening/closing width operation button 81 with his (or her) finger, the opening/closing width cannot be changed, reacting to the touching of such level; therefore, the unintended change in the opening/closing width can be prevented so as to improve the user's operability. Further, in a case where the pressing force to be equal or greater than a predetermined value for turning ON is adjusted when the ON/OFF sensor 95 is a piezoelectric sensor, it is possible to appropriately perform settings, such as a setting in which cutting operation can be performed by changing the opening/closing width with a light force, or a setting in which the opening/closing width does not change unless being firmly pressed.

The control board 109 is provided, on a back surface opposite to the surface on which the LEDs 104 are arranged, with an opening/closing angle detecting sensor group 105 (see FIG. 5) that detects the positions of the nut 13 and the nut holder 14. Thus, the control board 109 can detect the positions of the nut 13 and the nut holder 14 so as to grasp the opening angle of the movable blade 4.

The control board 109 functions as a control unit that performs various types of control, and executes opening/closing operation control processing of the movable blade 4, mode switching processing, and remaining power display processing.

Based on the ON operation (a pressing operation) by the trigger button 61 detected by the ON/OFF sensor 75, the control board 109 that performs the opening/closing operation control processing rotates, when an ON operation is performed, the motor 6 in the positive direction to retract the nut 13 to the base portion side (the motor unit 30 side) by the screw shaft 15 to close the movable blade 4.

In the opening/closing operation control processing, when the pressing of the trigger button 61 is released and the ON/OFF sensor 75 detects an OFF operation (a release operation), the motor 6 is rotated in the reverse direction to advance the nut 13 toward the distal end side (the movable blade 4 side) by the screw shaft 15 to open the movable blade 4.

The control board 109 that performs the mode switching processing switches the maximum open position of the movable blade 4 in a normal state where the ON/OFF sensor 75 does not detect the ON operation. This switching is realized by switching the positions of the nut 13 and the nut holder 14 in the normal state by performing rotation control of the motor 6.

The control board 109 that performs the remaining power display processing changes the number of the light emission of the LEDs 104 according to the remaining power supplied from the battery (not shown). Thus, the user can recognize that the remaining power is high as the number of the light emission increases, and the remaining power is low as the number of the light emission decreases.

Figure 5:
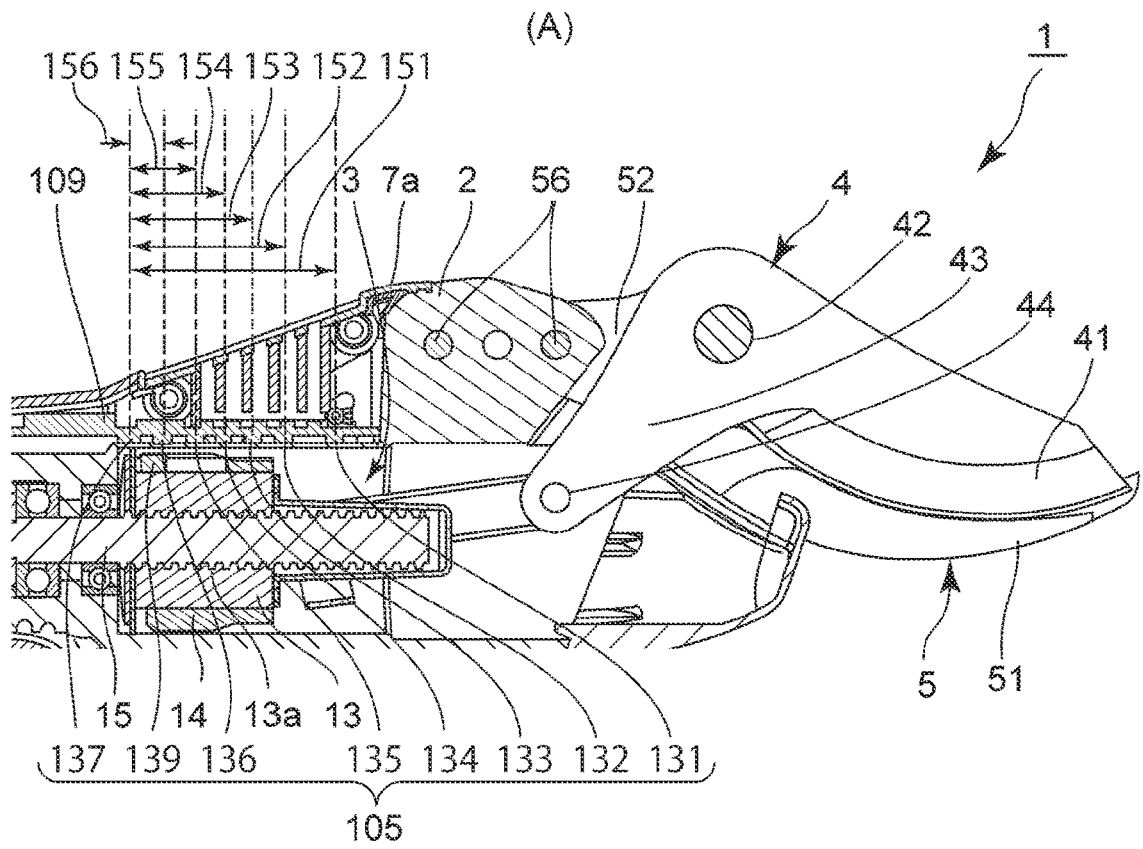
FIG. 5 shows an enlarged longitudinal section around an opening/closing angle detecting sensor group.
Figure 5:
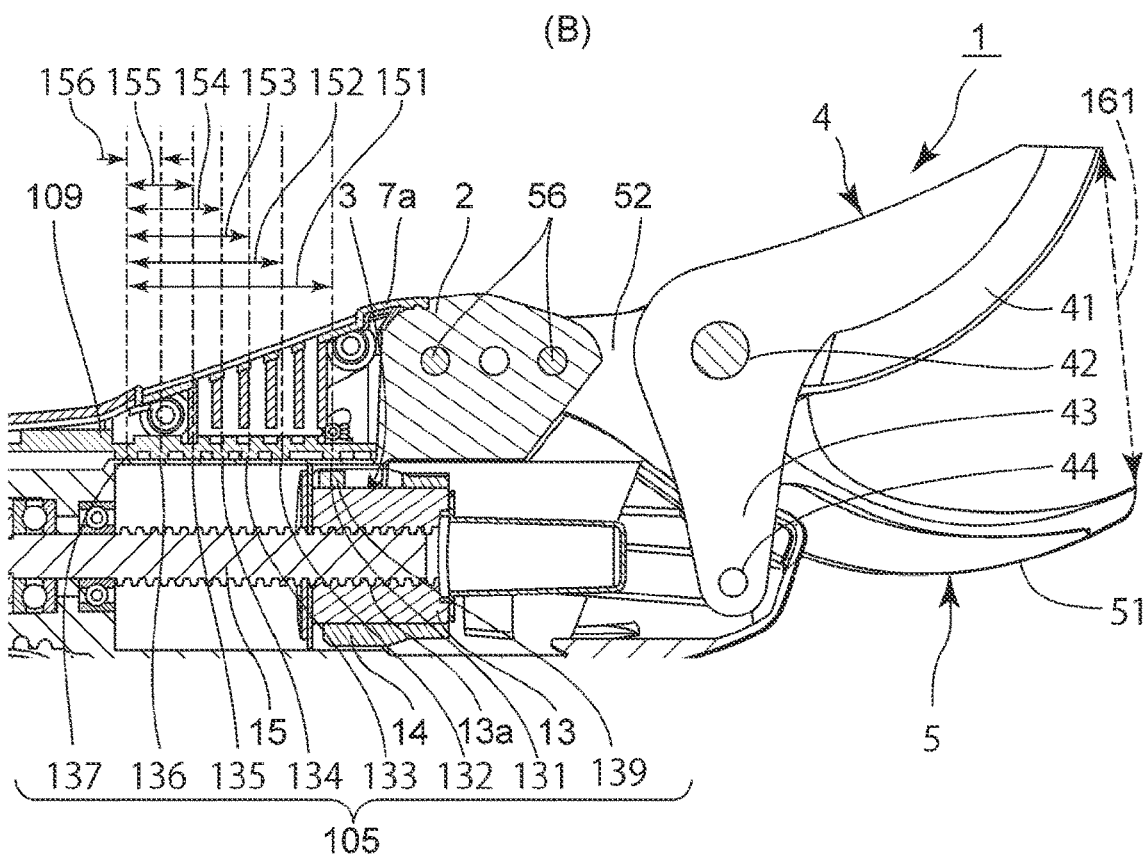

FIG. 5 is an explanatory diagram in an enlarged longitudinal sectional view of the vicinity of the opening/closing angle detecting sensor group 105, where FIG. 5 (A) shows a fully closed state, and FIG. 5 (B) shows a fully opened state (a state where an opening/closing width 161 is a first opening/closing width).

The opening/closing angle detecting sensor group 105 includes a first sensor 131, a second sensor 132, a third sensor 133, a fourth sensor 134, a fifth sensor 135, a sixth sensor 136, and a full-close detection sensor 137.

The first sensor 131 and the full-close detection sensor 137 are analog sensors that detect a distance from a detection object 139 provided in the nut holder 14, and the second sensor 132 to the sixth sensor 136 are digital sensors that detect when the detection object 139 provided in the nut holder 14 approaches. These first sensor 131 to full-close detection sensor 137 can be, for example, Hall effect sensors, the detection object 139 can be a magnet (permanent magnet). The detection object 139 can be configured by, for example, a permanent magnet in which the axis of the magnetic field is parallel to the alignment direction from the first sensor 131 to the full-close detection sensor 137.

The second sensor 132, the third sensor 133, the fourth sensor 134, the fifth sensor 135, and the sixth sensor 136 are arranged in a line in the front-back movement direction of the nut holder 14 (the axial direction of the screw shaft 15) corresponding to the positional relationship of the nut holder 14 with respect to the opening angle of the movable blade 4. The second sensor 132, the third sensor 133, the fourth sensor 134, the fifth sensor 135, and the sixth sensor 136 are disposed correspond to the facing position of the detection object 139 when movable blade 4 is at the open position of a second opening/closing width, the facing position of the detection object 139 when movable blade 4 is at the open position of a third opening/closing width, the facing position of the detection object 139 when movable blade 4 is at the open position of a fourth opening/closing width, the facing position of the detection object 139 when movable blade 4 is at the open position of a fifth opening/closing width, and the facing position of the detection object 139 when movable blade 4 is at the open position of a sixth opening/closing width, respectively. Thus, with respect to the change of the open position of movable blade 4 accompanying the change of the opening/closing width, the opening angle of movable blade 4 can be accurately and reliably grasped and stopped.

Figure 6:
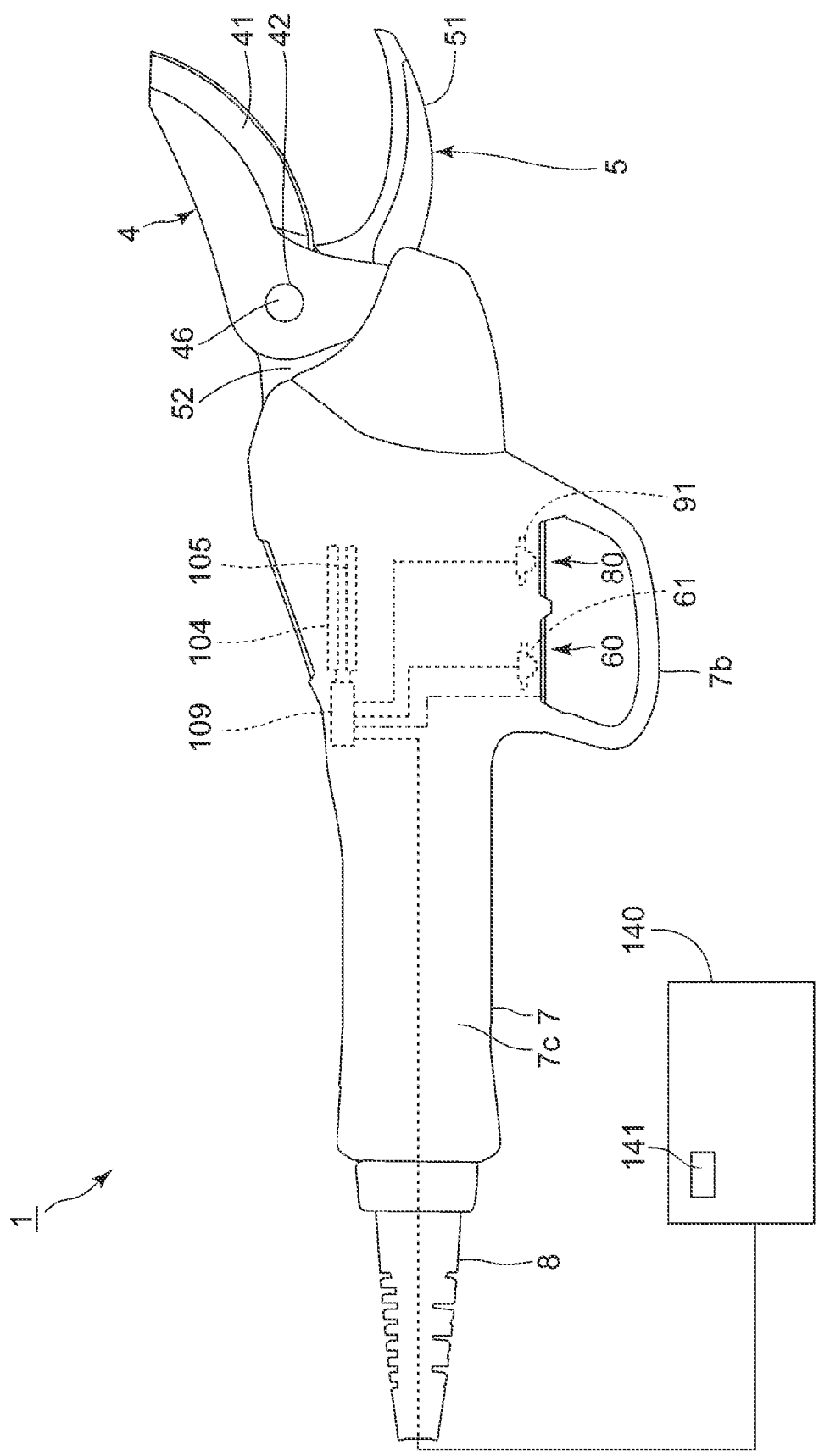
FIG. 6 shows a block configuration of an electric system of the electric pruning shears.

FIG. 6 is an explanatory diagram showing a block configuration of an electric system of the electric pruning shears 1.

The control board 109 is connected with the LEDs 104, the opening/closing angle detecting sensor group 105, the trigger button 61, and the opening/closing width operation button 81, and power is supplied to the control board 109 from a control box 140 functioning as a power supply unit through the power cable 8.

The control box 140 is provided with a mode switching operation portion 141 for mode switching. The mode switching operation portion 141 is constituted by an appropriate operation portion such as, for example, a pressing switch for sequentially switching the mode every time the pressing switch is pressed, or a dial type switch in which a plurality of contact points whose number is the same as the number of modes are provided, and mode is switched depending on whether the dial is stopped at the position of the contact points. Appropriate modes, such as a plurality of types of modes having different stages of switchable opening/closing widths or a maintenance mode for maintenance, can be provided as the switching mode. In the present embodiment, a multi-stage setting mode in which the opening/closing width can be changed in six stages and a two-stage setting mode in which the opening/closing width can be changed in two stages are provided.

Thus, according to the mode set in the control box 140 (in the present embodiment, one of the multi-stage setting mode and the two-stage setting mode is set), the control board 109 can switch the opening/closing width when the opening/closing width operation button 81 is operated, perform the opening/closing operation of the movable blade 4 when the trigger button 61 is operated, detect the position of the movable blade 4 by the opening/closing angle detecting sensor group 105 when the opening/closing width is switched or the opening/closing operation is performed, and display the remaining power of the battery of the control box 140 by the LEDs 104.

Figure 7:
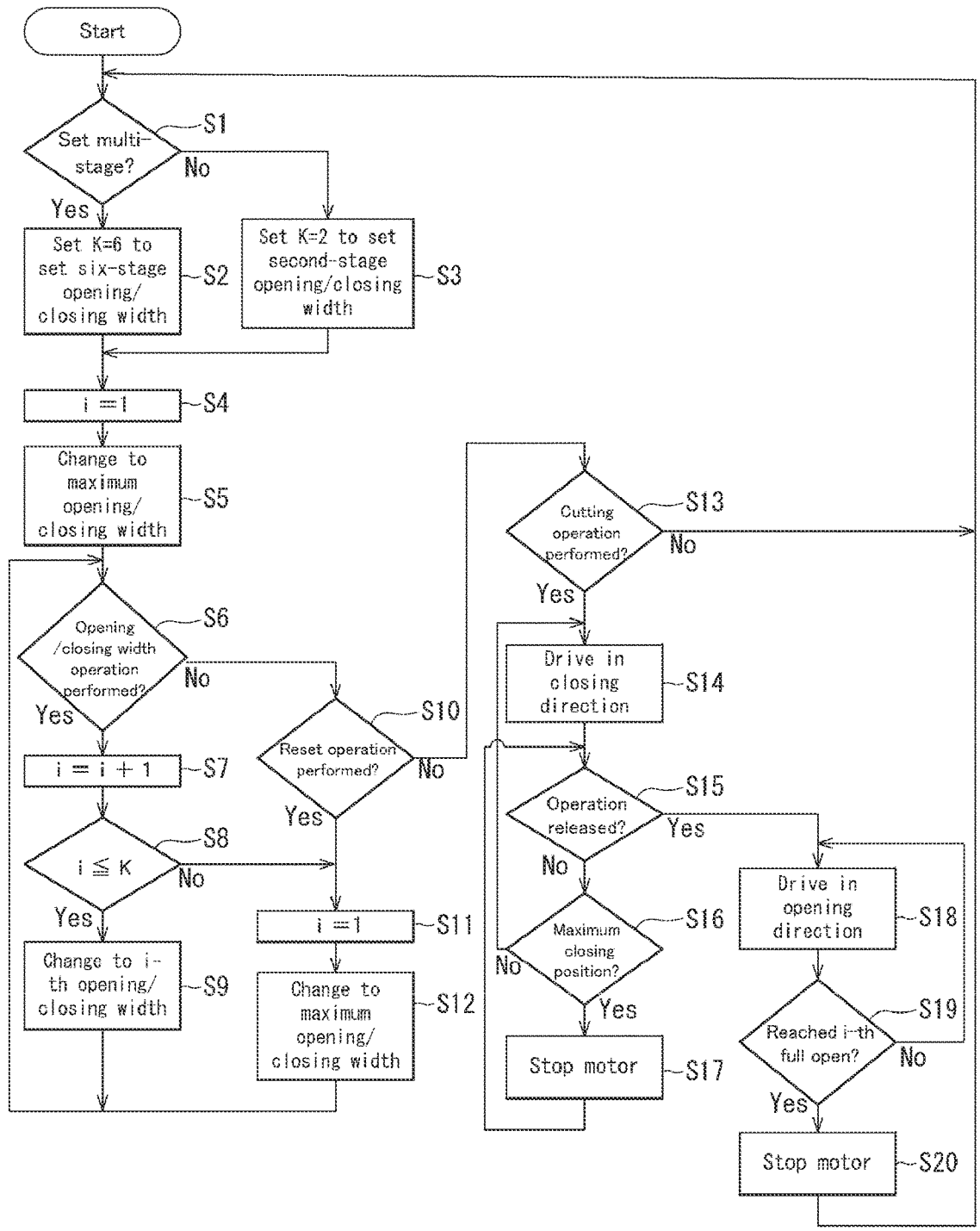
FIG. 7 is a flowchart of operations of a control board.

FIG. 7 is a flowchart of the operation of the control board 109.

When the power is turned ON and operation is started, first, the control board 109 confirms whether the mode set in the control box 140 is the multi-stage setting mode or the two-stage setting mode. If the mode is the multi-stage setting mode (step S1: Yes), a numerical value "6" is substituted for a constant K, so that a six-stages setting is performed as the opening/closing width (step S2). The six-stages setting can be set as follows, for example.

First opening/closing width: 57 mm, a first operation width 151 to the detection position by the first sensor 131.

Second opening/closing width: 50 mm, a second operation width 152 to the detection position by the second sensor 132.

Third opening/closing width: 41 mm, a third operation width 153 to the detection position by the third sensor 133.

Fourth opening/closing width: 32 mm, a fourth operation width 154 to the detection position by the fourth sensor 134.

Fifth opening/closing width: 22.5 mm, a fifth operation width 155 to the detection position by the fifth sensor 135.

Sixth opening/closing width: 12 mm, a sixth operation width 156 to the detection position by the sixth sensor 136.

In the case where the mode is not the multi-stage setting mode (step S1: No), since the control board 109 is in the two-stage setting mode, a numerical value "2" is substituted for the constant K, so that two-stage setting is performed as the opening/closing width (step S3). The two-stage setting can be set as follows, for example.

First opening/closing width: 57 mm, a first operation width to the detection position by the first sensor 131.

Second opening/closing width: 41 mm, a second operation width to the detection position by the third sensor 133.

The control board 109 in which one of the setting modes is set substitutes the numerical value "1" for a variable i (step S4) to change the opening/closing width to the first opening/closing width that is the maximum opening/closing width (step S5).

When the ON/OFF sensor 95 detects that the opening/closing width operation button 81 is pressed (operated) (step S6: Yes), the control board 109 adds 1 to the variable i (step S7).

If the variable i after the addition is the constant K or less (step S8: Yes), the control board 109 changes the opening/closing width to the i-th opening/closing width (step S9), and the process returns to step S6. In the change to the i-th opening/closing width, the motor 6 is driven to a position where the detection object 139 is detected by the i-th sensor (131~136) to narrow the opening/closing width of the movable blade 4 to thereby reduce the opening/closing width of the movable blade 4 by one stage in the closing direction.

Here, in the case of the multi-stage setting mode, since the constant K is 6, the opening/closing width is decreased by one stage each time the opening/closing width operation button 81 is pressed, starting from the fully opened position where the detection object 139 is detected by the first sensor 131, and steps S6 to S9 can be repeated until the opening/closing width reaches the minimum opening/closing width where the detection object 139 is detected by the sixth sensor 136.

In the case of the two-stage setting mode, since the constant K is 2 and the second opening/closing width is the detection position by the third sensor 133, when the opening/closing width operation button 81 is pressed once, the motor 6 is driven until reaching the opening/closing width where the detection object 139 is detected by the third sensor 133.

When a reset operation is performed (step S10: Yes) instead of the opening/closing width operation (step S6: No), the control board 109 substitutes the numerical value "1" into the variable i to initialize the variable i (step S11), operates the motor 6 until the movable blade 4 reaches the maximum opening/closing width (until the detection object 139 is detected by the first sensor 131) (step S12), and returns the process to step S6. The reset operation is executed by the control board 109 when, for example, the ON/OFF sensor 75 detects that the opening/closing width operation button 81 is continuously pressed for a predetermined time or longer, and thereby the reset operation is determined to be performed.

When the reset operation is not performed (step S10: No) and the ON/OFF sensor 75 detects that the cutting operation is performed by pressing the trigger button 61 (step S13: Yes), the control board 109 drives the motor 6 to move the movable blade 4 in the closing direction (step S14). When the cutting operation is not performed (step S13: No), the control board 109 returns the process to step S6 and waits until the next action is detected.

When the user does not release the operation by, for example, releasing the finger from the trigger button 61 (step S15: No), and the current detection object 139 does not reach the maximum close position (step S16: No), the control board 109 returns the process to step S14 and repeats the process.

The motor 6 is driven until the current detection object 139 is detected by the full-close detection sensor 137 (until the movable blade 4 is in a fully closed state) (step S16: No), and when the detection object 139 is detected by the full-close detection sensor 137 (step S16: Yes), the control board 109 stops the rotation of the motor 6 (step S17), and returns the process to step S15.

When the user releases the operation by, for example, releasing the finger from the trigger button 61 (step S15: Yes), the control board 109 drives the motor 6 to move the movable blade 4 so as to spread in the opening direction (step S18).

The control board 109 returns the process to step S18 and repeats the process until reaching of the fully opened position within the opening/closing width where the detection object 139 is detected by the current i-th sensor is detected (step S19: No).

When reaching of the fully opened position within the opening/closing width where the detection object 139 is detected by the current i-th sensor is detected (step S19: Yes), the control board 109 stops the motor 6 (step S20) and returns the process to step S1.

The control board 109 repeats the above operation until the power is turned off.

According to the above configuration and operation, it is possible to provide the electric pruning shears 1 capable of arbitrarily adjusting the opening/closing width (the maximum opening angle) of the movable blade 4, thereby improving the user's satisfaction.

Further, since the user can set an arbitrary opening/closing width, and perform opening/closing to perform the cutting operation, it is possible to, for example, cut thick branches one after another with the opening/closing width set to be maximum, and cut thin branches one after another in a narrow space with the opening/closing width set to be small. Thus, for example, in the case of a trigger-interlocking type pruning shears in which the blades closes according to the distance by which the trigger is pulled, the opening/closing amount needs to be adjusted by pulling the trigger halfway every time the thin branch in the narrow space is cut; however, the electric pruning shears 1 described above can continuously cut the thin branch in the narrow space in a short time without taking such labor.

Further, since the opening/closing width selectable by the maximum open position adjusting portion 80 is not 0 (not in a completely closed state), it is possible to prevent a state in which a branch or the like cannot be cut even if the movable blade 4 is closed and the operation portion 60 is operated.

Further, owing to the configuration in which the opening/closing width is narrowed by one stage every time the maximum open position adjusting portion 80 is operated, and owing to the configuration in which when the opening/closing width reaches the minimum opening/closing width, the opening/closing width is returned to the maximum opening/closing width, a skilled operator can quickly operate the maximum open position adjusting portion 80 as many times as necessary to quickly change the opening/closing width to a target opening/closing width.

Further, since when the opening/closing width operation button 81 is continuously pressed for a predetermined time, the reset operation is performed to return to the initial state in which the opening/closing width is the maximum, even if the current opening/closing width is unknown, the opening/closing width can be easily and quickly returned to the maximum opening/closing width by pressing the opening/closing width operation button 81 for the predetermined time.

Further, since the number of stages can be switched so as to switch between the multi-stage setting mode and the two-stage setting mode, it is possible to use the number of stages that is easy to use according to the purpose. To be specific, the multi-stage setting mode can be set when various opening/closing amounts are required, and the two-stage setting mode can be set when two states, i.e., the fully opened state and the half-opened state, are sufficient. Thus, it is possible to perform setting according to the use and the situation, so that work efficiency can be improved.

Further, while the trigger button 61 is pressed, the movable blade 4 moves in the closing direction, but when the trigger button 61 is released, the movable blade 4 moves in the opening direction (the opposite direction) instead of stopping, so that it is easy to stop cutting halfway. Further, since the change to the releasing operation by opening the trigger button 61 is performed instantaneously, it is possible to prevent the branch from being damaged by the closing operation of the movable blade 4 by mistake.

Further, since the first sensor 131 and the full-close detection sensor 137 are analog sensors, the fully opened position and the fully closed position of the movable blade 4 can be adjusted by setting the control board 109. Note that such an adjustment can be performed separately from the detection by the second sensor 132, the third sensor 133, the fourth sensor 134, the fifth sensor 135, and the sixth sensor 136.

Further, since the second sensor 132, the third sensor 133, the fourth sensor 134, the fifth sensor 135, and the sixth sensor 136 are digital sensors, it is possible to accurately position the stepwise opening/closing width.

Further, since the ON/OFF sensors 75 and 95 are configured to detect ON/OFF, they function as an ON/OFF detector, so that the operation can be facilitated. To be specific, when the operation portion 60 including the ON/OFF sensor 75 detects ON, the motor 6 rotates at a constant rotation speed, whereby the movable blade 4 closes at a constant speed; while when the operation portion 60 detects OFF, the motor 6 rotates reversely at a constant rotation speed, whereby the movable blade 4 opens at a constant speed. Therefore, the opening/closing operation is not too fast or too slow, so that stable operation can be realized. The opening/closing speed can be adjusted by employing a configuration in which the setting of the rotation speed of the motor 6 is changed by operating the control box 140 or the control board 109.

Further, since the ON/OFF sensor 75 (95), the deformable body 74 (94), and the pressing surface portion 62 (82) are arranged in a straight line in this order in the detectable pressing direction, the pressing operation of the pressing surface portion 62 (82) by the user can be appropriately transmitted to the ON/OFF sensor 75 (95), and the pressing force (a push-down force) can be appropriately reduced by the deformation of the deformable body 74 (94).

Further, since the motor 6, the screw shaft 15, the nut 13, and the link rod 11 are provided as the operation mechanism, the rotational force of the motor 6 is converted into the front-back operation of the nut 13 and transmitted to the link rod 11, and the movable blade 4 can be reliably and stably opened/closed by the link rod 11.

Further, since the trigger button 61 (the opening/closing width operation button 81) has the pressing surface portion 62 (82) having a width of at least half of the thickness of an operation finger of a general person, and the support strut 63 (83) partially protruding toward the deformable body 74 (94), it is easy for the user to press with his (or her) finger, and the pressing force can be collected in the support strut 63 (83) to be appropriately transmitted to the deformable body 74 (94) and the ON/OFF sensor 75 (95).

Further, since the deformable body 74 (94) is separated from the ON/OFF sensor 75 (95) and the deformable body 74 (94) is supported by the bridge 73 (93) around the pressing direction, and since the bridge 73 (93) is formed of a deformable material, the deformable body 74 (94) does not contact the ON/OFF sensor 75 (95) and does not operate until the trigger button 61 (the opening/closing width operation button 81) is pressed to some extent. Therefore, it is possible to prevent the movable blade 4 from operating caused by unintentionally touching the trigger button 61 (the opening/closing width operation button 81), so that it is possible to safely use the movable blade 4.

Further, owing to the configuration in which the bridge 73 (93) is formed in an inclined shape inclined linearly or curvilinearly with respect to the direction orthogonal to the pressing direction, the inclined shape is changed when the deformable body 74 (94) is pressed by the support strut 63 (83), and the bridge returns to the inclined shape when released from the pressing by the support strut 63 (83), it is possible to smoothly perform the operation from the time the user presses down the trigger button 61 (the opening/closing width operation button 81) until the time the deformable body 74 (94) comes into contact with the ON/OFF sensor 75 (95) and the movable blade 4 starts moving, and the operation of stopping the pressing and returning. Thus, it is possible to provide a good operational feeling.

Further, according to the various configurations described above, since the ON/OFF sensor 75 (95) that detects the pressing operation by the user has no moving portion, and detects the pressure at the fixed position, detection accuracy does not decrease even in long-term repeated use, so that stable operation can be realized.

Further, since the ON/OFF sensor 75 (95) has no moving portion, it is possible to prevent problems caused by dust as much as possible, so that it is possible to stably operate with high durability even in use in various environments outdoors.

Note that the present invention is not limited to the configuration of the above-described embodiment, and many embodiments can be obtained.

For example, the number of stages of the opening/closing width is not limited to six stages and two stages, and may be appropriate number of stages such as five stages, four stages, and/or three stages. Further, the mode is not limited to two modes such as the multi-stage setting mode and the two-stage setting mode, and may be configured to be switched from a plurality of modes such as three modes, four modes or the like.

Further, a mode display that displays a mode so that the current mode can be recognized may be provided in the electric pruning shears 1 or the control box 140. In such a case, the electric pruning shears 1 can allow the user to easily grasp the current mode.

An opening/closing width setting display that displays the current setting of the opening/closing width may be provided in the electric pruning shears 1. In such a case, the electric pruning shears 1 can allow the user to easily and clearly grasp how the current opening/closing width is set.

Further, the operation portion 60 and the maximum open position adjusting portion 80 are not limited to sensors using the ON/OFF sensors 75 and 95, and can be formed by a detection portion such as an appropriate sensor or switch that can detect ON/OFF, such as a button switch that detects pressing or a touch sensor that detects contact.

Further, the finger operating the trigger button 61 is assumed to be the index finger in the example shown in the drawings; however, the finger operating the trigger button 61 is not limited to the index finger, but can be any one finger of the hand that holds the grip portion 7c. In such a case, the finger operating the trigger button 61 is preferably one of the thumb, the index finger, and the middle finger, more preferably one of the index finger and the middle finger, and most preferably the index finger.

Further, the change in the inclination of the bridge 73 (93) is not limited to the above-described configuration, but may be an appropriate change such as an increase in the inclination angle, a decrease in the inclination angle, a change from an inclined state to a horizontal state, or a change from a horizontal state to an inclined state in comparison between before and after pressing. In such cases, the same effect can be obtained.

Further, the bridge 73 (93) may be configured such that a separation distance between a portion connected to the deformable body 74 (94) and the ON/OFF sensor 75 (95) is longer than that in the example shown in the drawings, and the deformable body 74 (94) may be configured to be longer in the pressing direction, or a plurality of deformable bodies 74 (94) may be connected and arranged in the pressing direction. In such cases, since the length in the pressing direction of the deformable body 74 (94) becomes long, the pressing force by the finger can be further reduced, and the stroke of the pressing operation can be lengthened. Therefore, the user can more easily adjust closing amount of and/or closing speed of the movable blade 4 by adjusting the pressing operation of the trigger button 61 (opening/closing width operation button 81).

Further, the maximum open position adjusting portion 80 is arranged side by side with the operation portion 60 in the axial direction of the screw shaft 15; however, the maximum open position adjusting portion 80 is not such limited, but can be arranged at any place. For example, the maximum open position adjusting portion 80 can be arranged at an appropriate position such as a lateral position of the operation portion 60 (a position adjacent to the operation portion 60 in the circumferential direction of the screw shaft 15) or a position in the vicinity of the display 103. Examples of the position in the vicinity of the display 103 include appropriate positions such as a lateral position of the display 103 (a position adjacent to the display 103 in the circumferential direction of the screw shaft 15) and a longitudinal position of the display 103 (a position adjacent to the display 103 in the axial direction of the screw shaft 15); and the shape of the display 103 can be reduced in size or thickness accordingly.

Even when the maximum open position adjusting portion 80 is arranged at various positions as mentioned above, the user can appropriately operate the maximum open position adjusting portion 80 to adjust the maximum opening angle of the movable blade 4, and can operate the operation portion 60 with the index finger of the hand that grips the grip portion 7c of the electric pruning shears 1 to open/close the movable blade 4. In particular, in the case where the maximum open position adjusting portion 80 is arranged longitudinally with the operation portion 60 as in embodiments 1 and 2, the user can smoothly perform an operation of changing the maximum opening angle of the movable blade 4 by extending the index finger and operating the maximum open position adjusting portion 80 while gripping the grip portion 7c of the electric pruning shears 1, and opening/closing the movable blade 4 by operating the operation portion 60.

INDUSTRIAL APPLICABILITY

The present invention can be used in an industry of a mechanical tool having a cutting function and used for pruning plants and the like.

REFERENCE SIGNS LIST

1: Electric pruning shears
4: Movable blade
5: Fixed blade
6: Motor
7c: Grip portion
11: Link rod
13: Nut
15: Screw shaft
60: Operation portion
62: Pressing surface portion
63: Support strut
73: Bridge
74: Deformable body
75, 110: ON/OFF sensor

The invention claimed is:

1. An electric cutting device for pruning comprising:
a cutting portion that performs cutting by sandwiching an object between two blades including at least one movable blade;
a cutting operation portion that receives a cutting input for causing the cutting portion to perform a cutting operation;
an operation mechanism that operates the movable blade in an opening direction and a closing direction;
a power supply unit that supplies power to the operation mechanism;
a control unit that operates with power of the power supply unit, receives the cutting input by the cutting operation portion, causes the operation mechanism to operate, and controls the cutting operation by the cutting portion; and
an opening/closing width operation portion that receives a change input of an opening/closing width of the movable blade,
wherein the control unit is configured to perform:
a setting changing operation of operating, when the opening/closing width operation portion receives the change input, the operation mechanism to move the movable blade at a maximum opening angle with an opening/closing width before change to a maximum opening angle with an opening/closing width after change; and
a movable blade opening/closing operation of operating, when the cutting operation portion is operated, the operation mechanism to open/close the movable blade between the maximum opening angle and a maximum closing angle with the opening/closing width after change, and
the control unit is configured to:
change the opening/closing width of the movable blade stepwise every time the opening/closing width operation portion receives the change input; and
receive mode switching to two or more modes of the number of stages of the opening/closing width capable of being changed by the opening/closing width operation portion, and execute the operation in the switched mode.

2. The electric cutting device for pruning according to claim 1, wherein the control unit is configured so that a fully closed state in which the movable blade is in a completely closed state cannot be selected as an opening/closing width selectable by the opening/closing width operation portion.

3. The electric cutting device for pruning according to claim 1, wherein the control unit is configured to change the opening/closing width of the movable blade short one stage at a time every time the opening/closing width operation portion receives the change input, and change the opening/closing width to a maximum opening/closing width after a minimum opening/closing width.

4. The electric cutting device for pruning according to claim 3, wherein the control unit is configured to cause, when the opening/closing width operation portion receives a reset input different from the change input, the operation mechanism to operate to open the movable blade to the maximum opening angle, and change the opening/closing width to the maximum opening/closing width.

5. A method of operating an electric cutting device for pruning including:
a cutting portion that performs cutting by sandwiching an object between two blades including at least one movable blade;
a cutting operation portion that receives a cutting input for causing the cutting portion to perform a cutting operation;
an operation mechanism that operates the movable blade in an opening direction and a closing direction;
a power supply unit that supplies power to the operation mechanism;
a control unit that operates with power of the power supply unit, receives the cutting input by the cutting operation portion, causes the operation mechanism to operate, and controls the cutting operation by the cutting portion; and
an opening/closing width operation portion that receives a change input of an opening/closing width of the movable blade,
the method comprising performing by the control unit:
a setting changing operation of operating, when the opening/closing width operation portion receives the change input, the operation mechanism to move the movable blade at a maximum opening angle with an opening/closing width before change to a maximum opening angle with an opening/closing width after change;
a movable blade opening/closing operation of operating, when the cutting operation portion is operated, the operation mechanism to open/close the movable blade between the maximum opening angle and a maximum closing angle with the opening/closing width after change;
an operation of changing the opening/closing width of the movable blade stepwise every time the opening/closing width operation portion receives the change input; and
an operation of receiving mode switching to two or more modes of the number of stages of the opening/closing width capable of being changed by the opening/closing width operation portion, and executing the operation in the switched mode.

* * * * *